(12) United States Patent
Tanji et al.

(10) Patent No.: US 9,282,291 B2
(45) Date of Patent: Mar. 8, 2016

(54) AUDIO VIDEO RECORDING DEVICE

(75) Inventors: Miho Tanji, Osaka (JP); Yoriko Yagi, Osaka (JP); Teruyuki Morita, Kyoto (JP); Yasutaka Ogama, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 264 days.

(21) Appl. No.: 12/985,995

(22) Filed: Jan. 6, 2011

(65) Prior Publication Data

US 2011/0102670 A1 May 5, 2011

Related U.S. Application Data

(63) Continuation of application No. PCT/JP2009/002938, filed on Jun. 26, 2009.

(30) Foreign Application Priority Data

Jul. 10, 2008 (JP) ................. 2008-180146

(51) Int. Cl.
*H04N 7/18* (2006.01)
*H04N 9/79* (2006.01)
(Continued)

(52) U.S. Cl.
CPC ............... *H04N 7/173* (2013.01); *H04N 5/765* (2013.01); *H04N 5/772* (2013.01); *H04N 9/7921* (2013.01);
(Continued)

(58) Field of Classification Search
CPC ............ H04N 21/433; H04N 21/4333; H04N 21/4334
USPC .......................................................... 348/61
See application file for complete search history.

(56) References Cited

U.S. PATENT DOCUMENTS 6,456,321 B1 * 9/2002 Ito et al. ................. 348/143
6,606,448 B1 8/2003 Terauchi
(Continued)

FOREIGN PATENT DOCUMENTS

JP 7-250305 9/1995
JP 11-046343 2/1999
(Continued)

OTHER PUBLICATIONS

Japanese Office Action issued in Japanese Patent Application No. 2008-180146 mailed Nov. 20, 2012.

*Primary Examiner* — Andy Rao
*Assistant Examiner* — Obafemi Sosanya
(74) *Attorney, Agent, or Firm* — McDermott Will & Emery LLP

(57) ABSTRACT

The present invention provides an audio video recording device which can easily post video contents on a video-sharing website without editing the video data to be posted. The audio video data recording device for recording audio and video data includes: a camera unit to which a captured moving image is inputted; a high-quality coding unit for compressing the moving image captured by the camera unit with a high image quality; a high-quality data storage unit for recording therein data of the compressed moving image outputted from the high-quality coding unit; a low-quality coding controller for starting or suspending a low-quality recording process during the high-quality recording process; a low-quality coding unit for compressing the moving image captured by the camera unit with a low image quality in accordance with an instruction by the low-quality coding controller; a low-quality data storage unit for recording therein data of the compressed moving image outputted from the low-quality coding unit; and a communication unit for transferring the moving image data recorded in the low-quality data storage unit to a different apparatus.

13 Claims, 16 Drawing Sheets

(51) Int. Cl.
*H04N 21/433* (2011.01)
*H04N 7/173* (2011.01)
*H04N 5/765* (2006.01)
*H04N 5/77* (2006.01)
*H04N 21/2743* (2011.01)
*H04N 21/4223* (2011.01)
*H04N 21/4402* (2011.01)

(52) U.S. Cl.
CPC ....... *H04N 21/2743* (2013.01); *H04N 21/4223* (2013.01); *H04N 21/4334* (2013.01); *H04N 21/440263* (2013.01); *H04N 21/440281* (2013.01)

(56) References Cited

U.S. PATENT DOCUMENTS

| | | | | |
|---|---|---|---|---|
| 2002/0051061 | A1* | 5/2002 | Peters | H04N 7/181 348/207.99 |
| 2003/0088877 | A1* | 5/2003 | Loveman | G06F 17/30017 725/92 |
| 2004/0010519 | A1 | 1/2004 | Sinn et al. | |
| 2004/0247296 | A1* | 12/2004 | Nakatani et al. | 386/96 |
| 2005/0117475 | A1* | 6/2005 | Abe et al. | 369/47.15 |
| 2006/0088297 | A1* | 4/2006 | Iguchi et al. | 386/117 |
| 2007/0047906 | A1 | 3/2007 | Hagiwara et al. | |
| 2007/0217761 | A1* | 9/2007 | Chen | H04N 9/79 386/228 |
| 2007/0297757 | A1* | 12/2007 | Kauffman et al. | 386/55 |
| 2008/0309778 | A1* | 12/2008 | Tabatabai et al. | 348/222.1 |

FOREIGN PATENT DOCUMENTS

| | | |
|---|---|---|
| JP | 11-150700 A | 6/1999 |
| JP | 2000-132954 | 5/2000 |
| JP | 2004-328636 | 11/2004 |
| JP | 2005-115606 | 4/2005 |
| JP | 2005-173890 | 6/2005 |
| JP | 2006-163901 | 6/2006 |
| JP | 2007-097121 | 4/2007 |
| JP | 2008-027494 A | 2/2008 |

* cited by examiner

F I G. 1
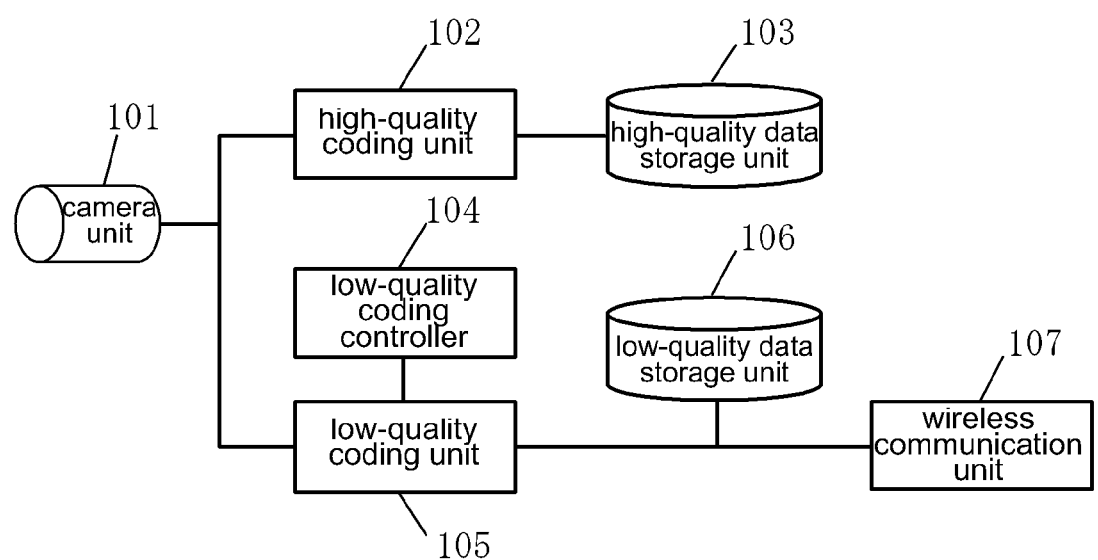

F I G. 1 5
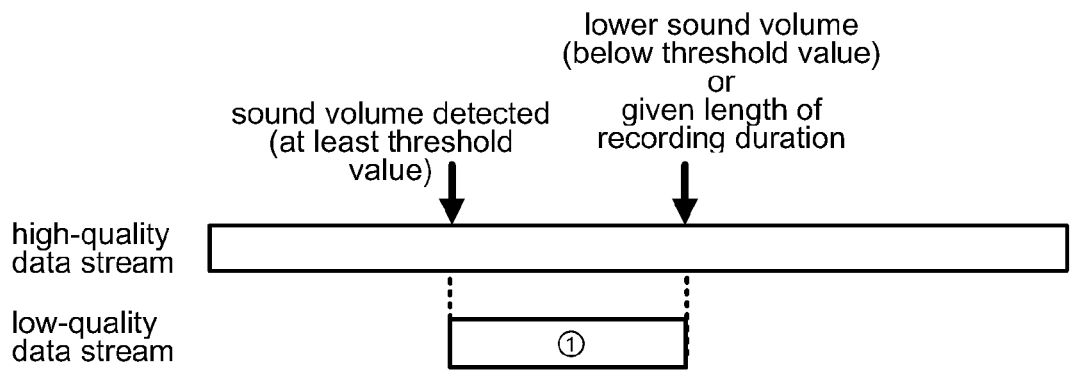
F I G. 1 6
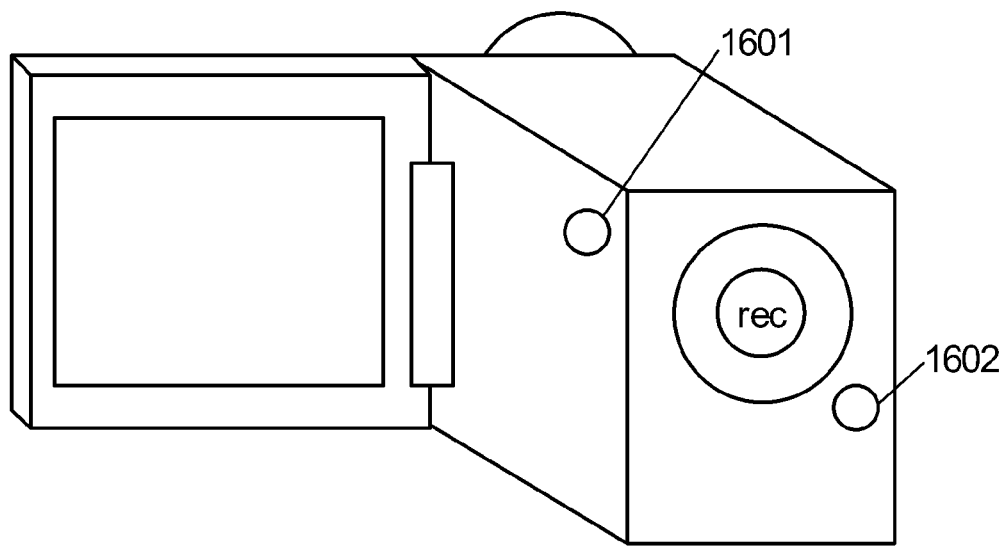

F I G. 1 7
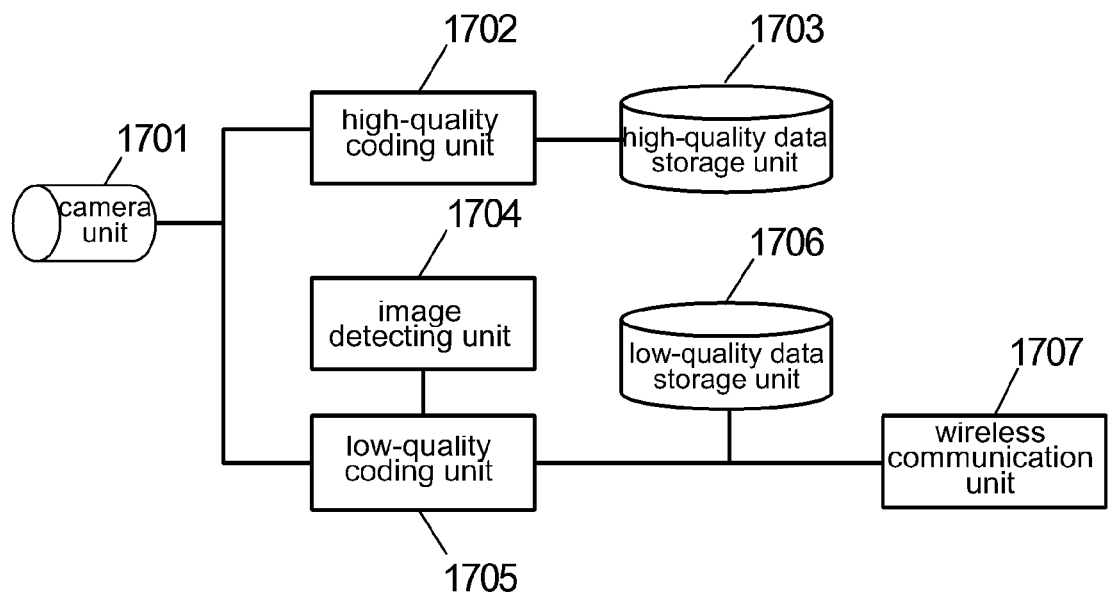

F I G. 2 0
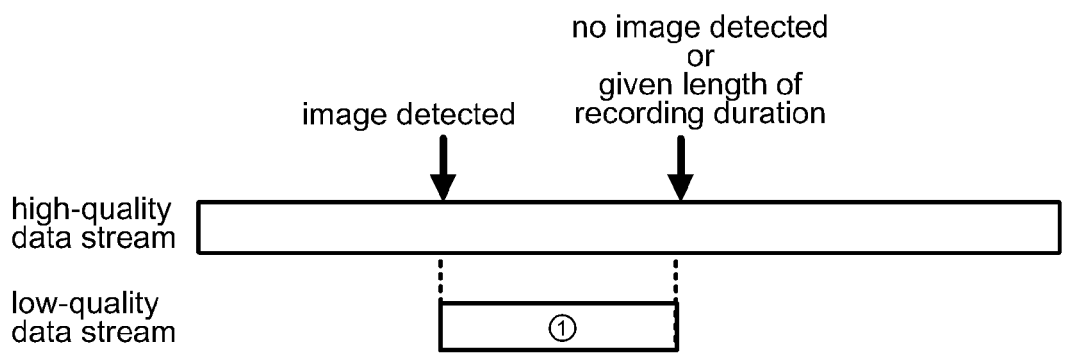
F I G. 2 1
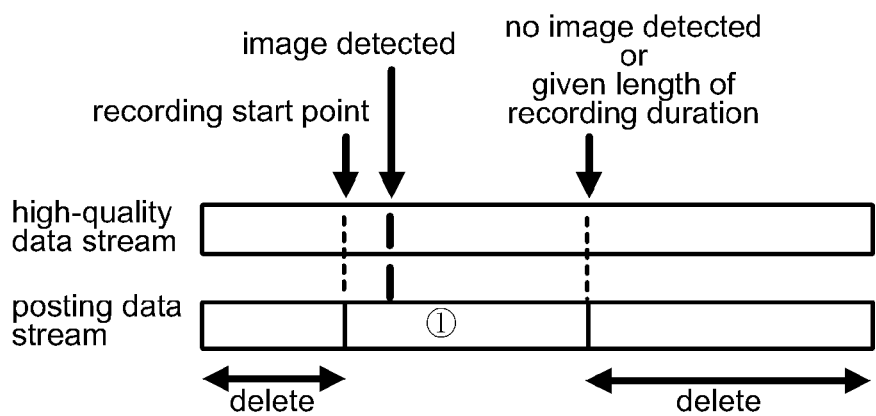

AUDIO VIDEO RECORDING DEVICE

CROSS-REFERENCE TO RELATED APPLICATION

This is a continuation of PCT International Application PCT/JP2009/002938 filed on Jun. 26, 2009, which claims priority to Japanese Patent Application No. 2008-180146 filed on Jul. 10, 2008. The disclosures of these applications including the specifications, the drawings, and the claims are hereby incorporated by reference in their entirety.

BACKGROUND OF THE INVENTION

1. Field of the Invention

The present invention relates to a device for recording audio and video data, more particularly to an audio video recording device, such as a video camera, capable of applying different coding techniques to an inputted moving image data and recording the moving image data differently coded at a time.

2. Description of the Related Art

In recent years, the digital video cameras are increasingly widespread among consumers very rapidly, and there are now different ways of viewing video images obtained by the cameras. The video images may be reproduced on the digital video cameras per se or viewed on televisions via media as conventionally done. A unique way to enjoy video images gaining popularity is various video-sharing websites on the Internet where viewers post their video images to share them with other website viewers.

When a website viewer wants to post any data recorded in his digital video camera on one of these video-sharing websites, he conventionally has to convert the video files recorded by the digital video camera using a personal computer into any format suitable for the video-sharing website. Then, he needs to set up the Internet environment before he actually posts the video images on the Internet website.

The Patent Document 1 discloses a technique for converting moving images, wherein lengthy moving image data to be transmitted through a mobile telephone is segmented by video codec and file size suitably for a destination of the data.

PRIOR ART DOCUMENT

Patent Document 1:
Unexamined Japanese Patent Applications Laid-Open No. 2005-173890

In the conventional devices used to distribute moving image data, there is a bottleneck in the conversion of moving image data; it is necessary to complete the recording process of its original files before the conversion.

All of the files are the target of the video conversion, and it is not possible to extract only the necessary files. Therefore, the conventional devices were not very suitable for posting the video contents on the video-sharing websites where recording time and data size are limited.

The present invention was accomplished to remove the conventional technical disadvantages, and provides an audio video recording apparatus capable of posting video image data on, for example, a video-sharing website without data editing which is a conventionally required process.

MEANS FOR SOLVING THE PROBLEM

An audio video recording device according to the present invention is a device for recording audio and video data, comprising:

a camera unit to which a captured moving image is inputted;

a high-quality coding unit for compressing the moving image captured by the camera unit with a high image quality;

a high-quality data storage unit for recording therein data of the compressed moving image outputted from the high-quality coding unit;

a low-quality coding controller for starting or suspending a low-quality recording process during the high-quality recording process;

a low-quality coding unit for compressing the moving image captured by the camera unit with a low image quality in accordance with an instruction by the low-quality coding controller;

a low-quality data storage unit for recording therein data of the compressed moving image outputted from the low-quality coding unit; and a communication unit for transferring the moving image data recorded in the low-quality data storage unit to a different apparatus.

The audio video recording device thus technically characterized can record the data with the low image quality as well as the high image quality. The audio video recording device can further start or suspend the low-quality recording process at any discretionary position of the data, thereby recording and editing the data at the same time.

The low-quality coding unit preferably stores the moving image data in the low-quality data storage unit, starting with the data outputted at a time point earlier by a given period of time than a time point when the low-quality coding controller starts the recording process.

The audio video recording device thus technically characterized can record the images captured earlier by the given period of time than the start of the low-quality recording process, thereby recording the data without missing a scene capturing a defining moment.

An audio video recording device according to the present invention is a device for recording audio and video data, comprising:

a camera unit to which a captured moving image is inputted;

a high-quality coding unit for compressing the moving image captured by the camera unit with a high image quality;

a high-quality data storage unit for recording therein data of the compressed moving image outputted from the high-quality coding unit;

a low-quality coding controller for starting or suspending a low-quality recording process during the high-quality recording process;

a low-quality coding unit for compressing the moving image captured by the camera unit with a low image quality in accordance with an instruction by the low-quality coding controller;

a low-quality data storage unit for recording therein data of the compressed moving image outputted from the low-quality coding unit;

a seamless information generating unit for generating an information used to seamlessly link the moving image data outputted from the low-quality coding unit to the low-quality data recorded in the past; and a communication unit for transferring the moving image data recorded in the low-quality data storage unit to a different apparatus.

The audio video recording device thus technically characterized can record the data with the low image quality as well as the high image quality. The audio video recording device can further record the data in seamless linkage to the low-quality data recorded in the past.

An audio video recording device according to the present invention is a device for recording audio and video data, comprising:

a camera unit to which a captured moving image is inputted;

a high-quality coding unit for compressing the moving image captured by the camera unit with a high image quality;

a high-quality data storage unit for recording therein data of the compressed moving image outputted from the high-quality coding unit;

an audio detecting unit for starting or suspending a low-quality recording process in the case where an inputted audio meets a given requirement during the high-quality recording process;

a low-quality coding unit for compressing the moving image captured by the camera unit with a low image quality in accordance with an instruction by the audio detecting unit;

a low-quality data storage unit for recording therein data of the compressed moving image outputted from the low-quality coding unit; and a communication unit for transferring the moving image data recorded in the low-quality data storage unit to a different apparatus.

The audio video recording device thus technically characterized can record the data with the low image quality as well as the high image quality. The audio video recording device can further automatically start or suspend the low-quality recording process depending on the inputted audio.

In the case where the audio detecting unit detects that the inputted audio meets the given requirement, the low-quality coding unit preferably stores the moving image data in the low-quality data storage unit, starting with the data outputted at a time point earlier by a given period of time than a time point when the audio detecting unit detects that the inputted audio meets the given requirement.

The audio video recording device thus technically characterized can record the images captured earlier by the given period of time than the start of the automatic low-quality recording process, thereby recording the data without missing a scene capturing a defining moment.

The audio detecting unit preferably starts or suspends the low-quality recording process when a sound volume exceeds a threshold value.

The audio video recording device thus technically characterized can record the data with the low image quality as well as the high image quality. The audio video recording device can further automatically start or suspend the low-quality recording process depending on the inputted sound volume.

An audio video recording device according to the present invention is a device for recording audio and video data, comprising:

a camera unit to which a captured moving image is inputted;

a high-quality coding unit for compressing the moving image captured by the camera unit with a high image quality;

a high-quality data storage unit for recording therein data of the compressed moving image outputted from the high-quality coding unit;

an image detecting unit for starting or suspending a low-quality recording process in the case where an image information registered in advance is detected in the inputted image during the high-quality recording process;

a low-quality coding unit for compressing the moving image captured by the camera unit with a low image quality in accordance with an instruction by the image detecting unit;

a low-quality data storage unit for recording therein data of the compressed moving image outputted from the low-quality coding unit; and a communication unit for transferring the moving image data recorded in the low-quality data storage unit to a different apparatus.

The audio video recording device thus technically characterized can record the data with the low image quality as well as the high image quality. The audio video recording device can further automatically start or suspend the low-quality recording process when the image detecting unit detects that the image registered in advance is detected, making an editing process unnecessary after the data is recorded.

In the case where the image detecting unit detects the image information registered in advance, the low-quality coding unit preferably stores the moving image data in the low-quality data storage unit, starting with the data outputted at a time point earlier by a given period of time than a time point when the image detecting unit detects the image information registered in advance.

The audio video recording device thus technically characterized can record the images captured earlier by the given period of time than the start of the automatic low-quality recording process, thereby recording the data without missing a scene capturing a defining moment.

The image detecting unit preferably starts or suspends the low-quality recording process in the case where a facial information registered in advance is detected.

The audio video recording device thus technically characterized can record the data with the low image quality as well as the high image quality. The audio video recording device can further automatically start or suspend the low-quality recording process when the facial information registered in advance is detected, making an editing process unnecessary after the data is recorded.

The low-quality coding unit preferably codes the moving image data in a format suitable for a video-sharing website, and the communication unit can post the moving image data recorded with the low image quality on the video-sharing website.

The audio video recording device thus technically characterized can record the moving images with the high image quality, and can further code the moving image data in a format suitable for an intended video-sharing site and directly communicate with the video-sharing website to post the coded moving image data thereon without PC.

An audio video recording device according to the present invention is a device for recording audio and video data, comprising:

an input unit for inputting a start or a suspend a low-quality coding process while continuing a high-quality coding process; and an input unit for inputting a start a communication.

The audio video recording device thus technically characterized can request to start or suspend the low-quality recording process and also start the communication through external inputs.

An audio video recording device according to the present invention is a device for recording audio and video data, comprising:

an input unit for switching to a mode configured to start or suspend a low-quality coding process while continuing a high-quality coding process in the case where an inputted audio meets a given requirement; and an input unit for starting a communication.

The audio video recording device thus technically characterized can start the audio detection to start or suspend the low-quality recording process and also start the communication through external inputs.

An audio video recording device according to the present invention is a device for recording audio and video data, comprising:

an input unit for switching to a mode configured to start or suspend a low-quality coding process while continuing a high-quality coding process in the case where an image information registered in advance is detected; and an input unit for starting a communication.

The audio video recording device thus technically characterized can start the image detection to start or suspend the low-quality recording process and also start the communication through external inputs.

EFFECT OF THE INVENTION

According to the present invention, a digital video camera can record video data in a medium in a format suitable for posting the data a video-sharing website, and transmit the video data to a different apparatus through a communication unit provided therein, making it unnecessary to use PC.

BRIEF DESCRIPTION OF THE DRAWINGS

FIG. 1 is a block diagram illustrating a video camera with a communication function according to an exemplary embodiment 1 of the present invention.

FIG. 15 is a conceptual view illustrating storage and deletion of the high-quality data and the low-quality data according to the exemplary embodiment 3 when a sound volume is detected.

FIG. 16 shows an external appearance of the video camera with a communication function according to the exemplary embodiment 3.

FIG. 17 is a block diagram illustrating a video camera with a communication function according to an exemplary embodiment 4 of the present invention.

FIG. 20 is a conceptual view illustrating storage and deletion of a high-quality data and a low-quality data according to the exemplary embodiment 4 when an image is detected.

FIG. 21 is a conceptual view illustrating storage and deletion of the high-quality data and the low-quality data according to the exemplary embodiment 4 after the pre-recording feature is set.

EXEMPLARY EMBODIMENTS FOR CARRYING OUT THE INVENTION

Figure 2:
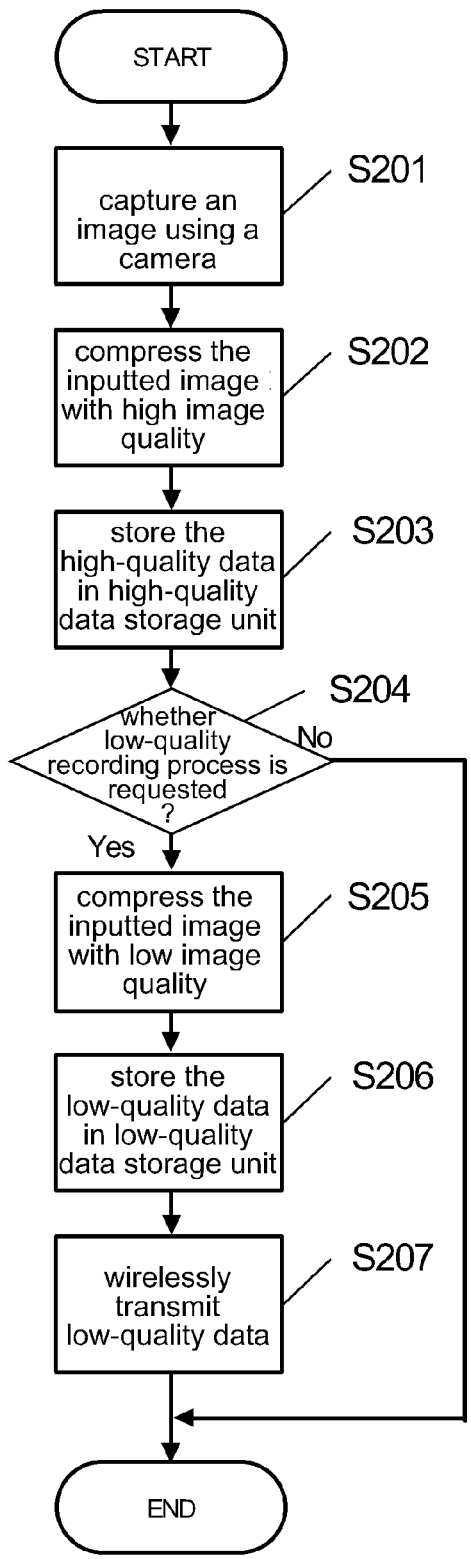
FIG. 2 is a flow chart illustrating an operation of the video camera with a communication function according to the exemplary embodiment 1.

Hereinafter, a video camera with a communication function, which is an example of an audio video recording device according to the present invention, is described referring to the drawings. In the following exemplary embodiment of the present invention, any structural elements described with the same reference symbols are similarly operated, therefore, may not be described again once they are described in any preceding sections.

Exemplary Embodiment 1

An exemplary embodiment 1 of the present invention describes processing steps for starting or suspending recording of an inputted moving image data with a low image quality by a discretionary timing chosen by a user while recording the same moving image data with a high image quality at a time.

FIG. 1 is a block diagram illustrating a video camera with a communication function according to the present exemplary embodiment. The video camera with a communication function comprises a camera unit 101 to which an image captured by a camera is inputted, a high-quality coding unit 102 for coding data of the inputted image with a high image quality, a high-quality data storage unit 103 for storing therein the high-quality coded data coded with the high image quality, a low-quality coding controller 104 for starting or suspending a low-quality recording process, a low-quality coding unit 105 for coding the inputted image data with a low image quality, a low-quality data storage unit 106 for storing therein the low-quality coded data, and a wireless communication unit 107 for transferring the low-quality data to a different apparatus.

A processing flow of the video camera with a communication function is described below.

The camera unit 101 inputs therein an image thereby captured which a user wants to record. The high-quality coding unit 102 compresses the image captured by the camera unit 101 with the high image quality.

Specifically describing the high image quality, for example, codec is "MPEG4 AVC/H264", an angle of view is 1,920×1,080, and a frame rate is 60 fps.

The high-quality data storage unit 103 stores therein the moving image data outputted from the high-quality coding unit 102.

When a user starts to record the moving image data with the low image quality during the high-quality recording process to post the recorded data on a website, the low-quality coding controller 104 activates the low-quality coding unit 105 responding to information inputted by the user, and requests the low-quality coding unit 105 to start the low-quality recording process. To suspend the low-quality recording process, the low-quality coding controller 104 requests the low-quality coding unit 105 to suspend the low-quality recording process when the duration of the information input from the user or the low-quality recording process exceeds a given period of time.

The low-quality coding unit 105 is instructed by the low-quality coding controller to code the image captured by the camera unit 101 with the low image quality, and compresses the image as instructed. The low-quality data storage unit 106 stores therein the low-quality moving image data outputted from the low-quality coding unit 105.

Specifically describing the low image quality, for example, codec is "MPEG4", an angle of view is 320×240, and a frame rate is 30 fps.

In the case where the device is preset to start the data recording at a time point earlier by a given period of time, generally called a pre-recording feature, the data storage by the low-quality data storage unit 106 may start with the moving image data outputted earlier by a given period of time than a time point when the low-quality coding controller 104 starts the data recording.

When the device is on standby after the pre-recording feature is set, all of images within a given timeframe are always stored and updated in an internal memory. More specifically, all of video images taken at a given time point onwards are recorded and erased repeatedly so that the latest video images at the given time point onwards are always stored. When the low-quality recording process starts, the video images in a built-in memory are transferred to the low-quality data storage unit 106 and linked to the low-quality data thereafter recorded. More specifically describing the given time point onwards, the video images to be stored can be traced back, for example, 10 seconds.

The wireless communication unit 107 transfers the moving image data recorded in the low-quality data storage unit 106 to a different apparatus. An example of the wireless communication is wireless LAN.

The wireless communication unit 107 can post the moving image data recorded with the low image quality on, for example, a video-sharing website.

When the moving image data is posted on the video-sharing website, the Internet address of the video-sharing website is registered in advance and accessed by the wireless communication unit 107, and any necessary low-quality data is chosen from the low-quality data storage unit 106 and posted on the website.

A microphone (not illustrated in the drawings) is used to input audio data.

Referring to a flow chart illustrated in FIG. 2, an operation of the video camera with a communication function is described.

First, a user positionally adjusts the camera unit 101 to face an intended object to capture its images (Step S201).

The high-quality coding unit 102 compresses the images captured by the camera unit 101 with the high image quality (Step S202).

The moving image data compressed with the high image quality is stored in the high-quality data storage unit 103 (Step S203).

Whether it is requested to start the low-quality recording process is confirmed (Step S204). Having confirmed that the low-quality recording process is requested, the images compressed with the high image quality are compressed by the low-quality coding unit 105 so as to comply with a file format suitable for posting the data on the video-sharing website, and image quality codec, bit rate, and frame rate which are lower than in the high-quality recording process (Step S205).

The moving image data compressed with the low image quality are stored in the low-quality data storage unit 106 (Step S206). Having confirmed in Step S204 that the low-quality recording process is not requested, the low-quality data is not recorded.

The data stored in the low-quality data storage unit 106 is posted on the video-sharing website by the wireless communication unit 107 (Step S207).

Figure 3:
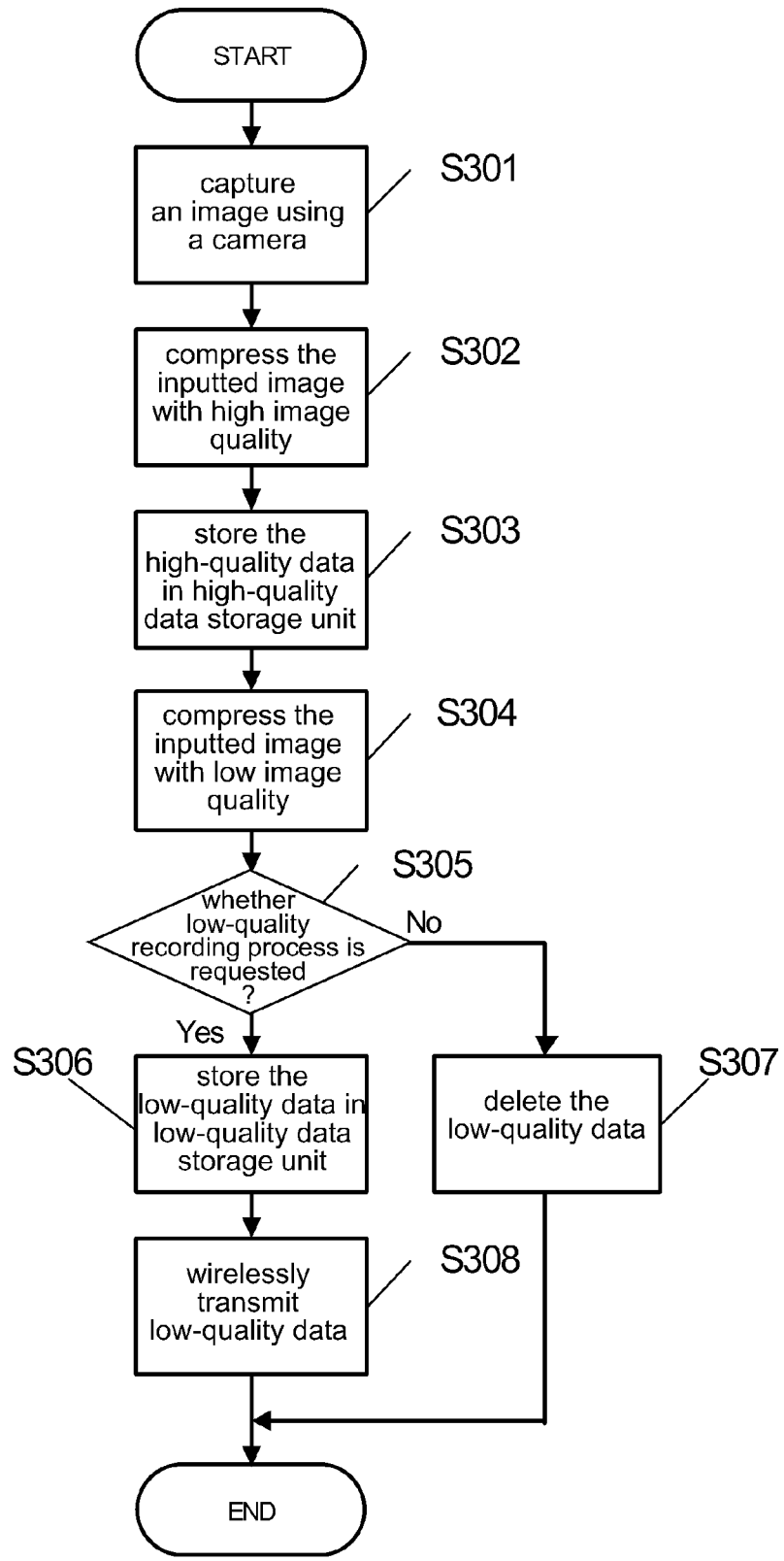
FIG. 3 is a flow chart illustrating an operation of the video camera with a communication function according to the exemplary embodiment 1 when a pre-recording feature is set.

Referring to a flow chart illustrated in FIG. 3, an operation of the video camera with a communication function at the time of setting the pre-recording feature is described.

First, a user positionally adjusts the camera unit 101 to face an intended object to capture its images (Step S301).

The high-quality coding unit 102 compresses the images captured by the camera unit 101 with the high image quality (Step S302).

The moving image data compressed with the high image quality is stored in the high-quality data storage unit 103 (Step S303).

The images compressed with the high image quality are compressed by the low-quality coding unit 105 so as to comply with a file format suitable for posting the data on the video-sharing website, and image quality codec, bit rate, and frame rate which are lower than in the high-quality recording process (Step S304).

Whether it is requested to start the low-quality recording process is confirmed (Step S305). Having confirmed that the low-quality recording process is requested, the low-quality data is stored in the low-quality data storage unit 106 (Step S306). Having confirmed that the low-quality recording process is not requested, the low-quality data is deleted (Step S307). The data stored in the low-quality data storage unit 106 is posted on the video-sharing website by the wireless communication unit 107 (Step S308).

Figure 4:
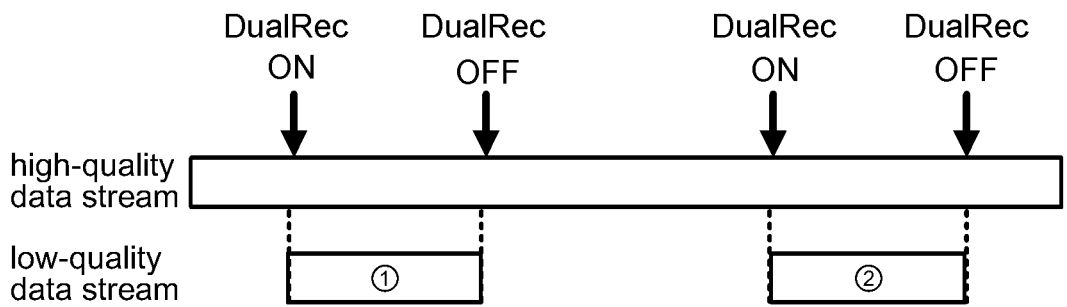
FIG. 4 is a conceptual view illustrating storage and deletion of a high-quality data and a low-quality data according to the exemplary embodiment 1.

FIG. 4 is a conceptual view of storage of the high-quality data and the low-quality data.

As illustrated in FIG. 4, the high-quality data (high-quality data stream) alone is outputted and recorded until it is requested otherwise by the user. As soon as the request from the user is received, the low-quality data (low-quality data stream) is outputted and stored in the low-quality data storage unit 106. When the user suspends the low-quality recording process or the duration of the low-quality recording process exceeds a given period of time, the output of the low-quality data is suspended.

Figure 5:
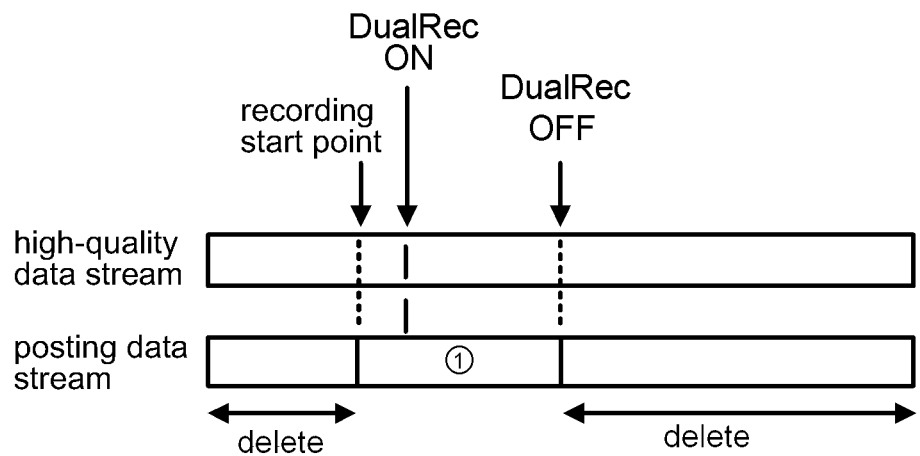
FIG. 5 is a conceptual view illustrating storage and deletion of the high-quality data and the low-quality data according to the exemplary embodiment 1 after the pre-recording feature is set.

FIG. 5 is a conceptual view of storage or deletion of the high-quality data and the low-quality data after the pre-recording feature is set.

As illustrated in FIG. 5, the high-quality data and the low-quality data are both outputted. However, the high-quality data alone is selectively recorded but the low-quality data is deleted during the high-quality recording process. Upon the user's request, the low-quality data is stored in the low-quality data storage unit 106, which starts with the low-quality data at a time point earlier by a given period of time than a time point when the user requested. When the user suspends the low-quality recording process or the duration of the low-quality recording process exceeds a given period of time, the deletion of the low-quality data restarts.

Thus, the device configured to record the same inputted image with the high and low image qualities both at a time is provided with the low-quality coding controller 104 capable of controlling the timing of start or suspension of the low-quality recording process, wherein only the data requested by the user can be recorded with the low image quality.

Figure 6:
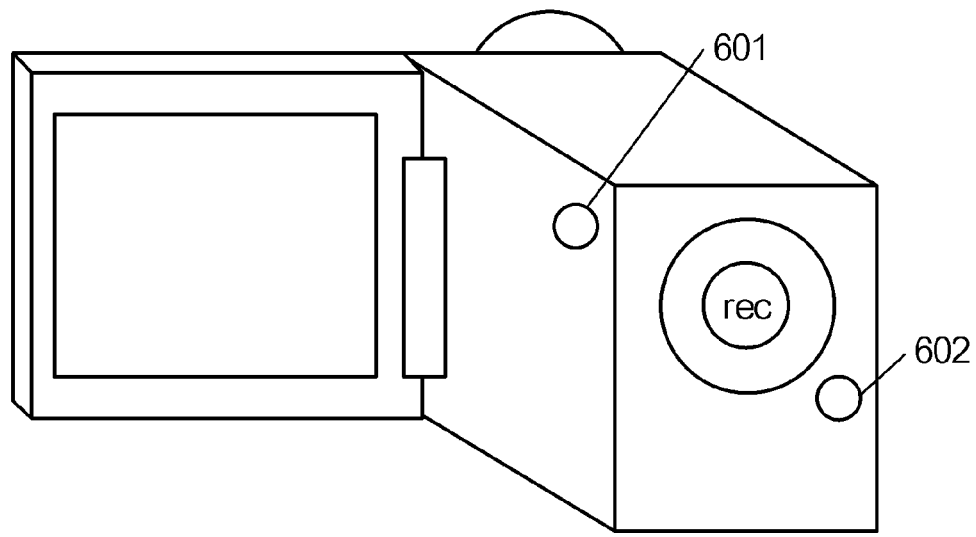
FIG. 6 shows an external appearance of the video camera with a communication function according to the exemplary embodiment 1.

FIG. 6 shows an external appearance of the video camera with a communication function.

As illustrated in FIG. 6, the video camera with a communication function comprises an input unit 601 for starting or suspending the low-quality recording process while continuing the high-quality coding process, and an input unit 601 for starting a wireless communication.

As described so far, the video camera with a communication function according to the present exemplary embodiment can record the same image with the high and low image qualities both at a time, thus recording the low-quality data that can be directly posted on the video-sharing website without editing.

Exemplary Embodiment 2

An exemplary embodiment 2 of the present invention describes processing steps for starting or suspending a low-quality recording process with respect to an inputted moving image data by a user's discretionary timing while recording the same moving image data with a high image quality at a time, and further recording the low-quality data thus recorded in linkage to the low-quality data recorded earlier.

Figure 7:
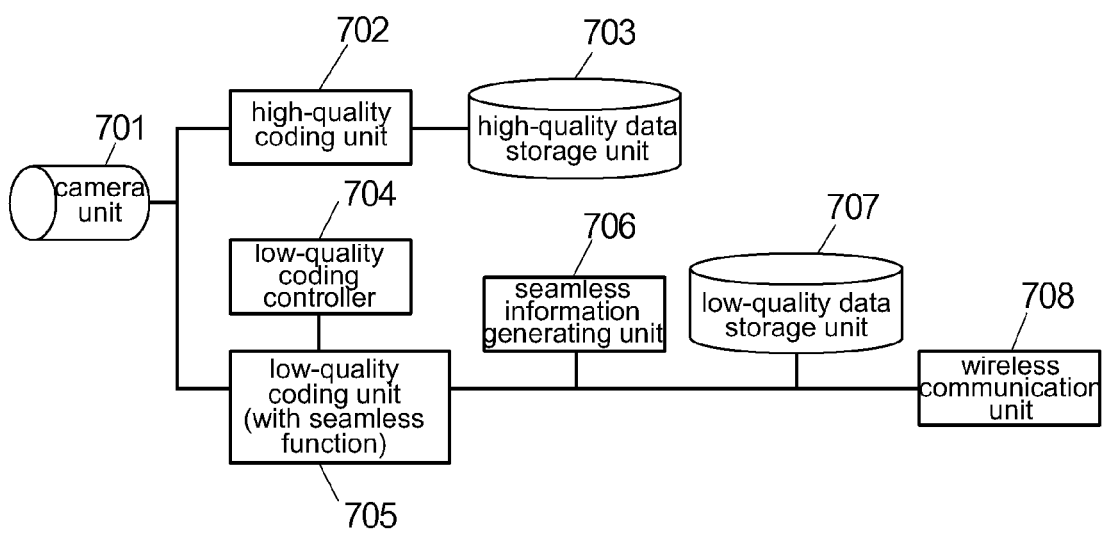
FIG. 7 is a block diagram illustrating a video camera with a communication function according to an exemplary embodiment 2 of the present invention.

FIG. 7 is a block diagram illustrating a video camera with a communication function according to the present exemplary embodiment.

The video camera with a communication function comprises a camera unit 701 to which an image obtained by a camera is inputted, a high-quality coding unit 702 for coding data of the inputted image with a high image quality, a high-quality data storage unit 703 for storing therein the high-quality coded data, a low-quality coding controller 704 for starting or suspending a low-quality recording process, a low-quality coding unit (with a seamless feature) 705 for coding the inputted image data with a low image quality, a seamless information generating unit 706 for generating an seamless information necessary for seamless linkage to the low-quality data recorded in the past, a low-quality data storage unit 707 for storing therein the low-quality coded data, and a wireless communication unit 708 for transferring the low-quality data to a different apparatus.

A processing flow of the video camera with a communication function is described below.

The camera unit 701 inputs therein an image thereby captured which a user wants to record. The high-quality coding unit 702 compresses the image captured by the camera unit 701 with the high image quality.

Specifically describing the high image quality, for example, codec is "MPEG4 AVC/H264", an angle of view is 1,920×1,080, and a frame rate is 60 fps.

The high-quality data storage unit 703 stores therein the moving image data outputted from the high-quality coding unit 702.

When a user starts to record the moving image data with the low image quality during the high-quality recording process to post the recorded data on a website, the low-quality coding controller 704 activates the low-quality coding unit 705 responding to information inputted by the user, and requests the low-quality coding unit 705 to start the low-quality recording process. To suspend the low-quality recording process, the low-quality coding controller 704 requests the low-quality coding unit 705 to suspend the low-quality recording process when the duration of the information input from the user or the low-quality recording process exceeds a given period of time.

The low-quality coding unit 705 is instructed by the low-quality coding controller to code the image captured by the camera unit 701 with the low image quality, and compresses the image as instructed. The low-quality data storage unit 707 stores therein the low-quality moving image data outputted from the low-quality coding unit 705.

Specifically describing the low image quality, for example, codec is "MPEG4", an angle of view is 320×240, and a frame rate is 30 fps.

The seamless information generating unit 706 generates an information used to seamlessly link the moving image data outputted from the low-quality coding unit 705 to the low-quality data recorded in the past.

The wireless communication unit 708 transfers the moving image data recorded in the low-quality data storage unit 707 to a different apparatus. An example of the wireless communication is wireless LAN.

The wireless communication unit 708 can post the moving image data recorded with the low image quality on, for example, a video-sharing website.

When the moving image data is posted on the video-sharing website, the Internet address of the video-sharing website is registered in advance and accessed by the wireless communication unit 708, and any necessary low-quality data is chosen from the low-quality data storage unit 707 and posted on the website.

A microphone (not illustrated in the drawings) is used to input audio data.

Figure 8:
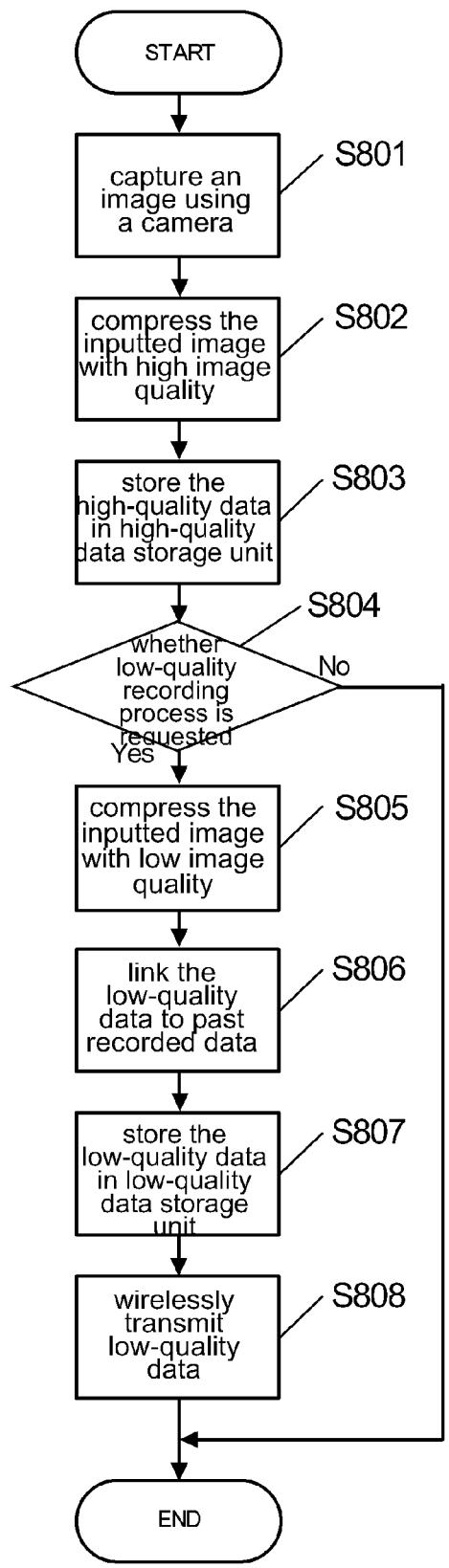
FIG. 8 is a flow chart illustrating an operation of the video camera with a communication function according to the exemplary embodiment 2.

Referring to a flow chart illustrated in FIG. 8, an operation of the video camera with a communication function is described.

First, a user positionally adjusts the camera unit 701 to face an intended object to capture its images (Step S801).

The high-quality coding unit 702 compresses the images captured by the camera unit 701 with the high image quality (Step S802).

The moving image data compressed with the high image quality is stored in the high-quality data storage unit 703 (Step S803).

Whether it is requested to start the low-quality recording process is confirmed (Step S804). Having confirmed that the low-quality recording process is requested, the images compressed with the high image quality are compressed by the low-quality coding unit 705 so as to comply with a file format suitable for posting the data on the video-sharing website, and image quality codec, bit rate, and frame rate which are lower than in the high-quality recording process (Step S805).

Then, the compressed data is linked to the data recorded in the past (Step S806) and stored in the low-quality data storage unit 707 (Step S807). Having confirmed in Step S804 that the low-quality recording process is not requested, the low-quality data is not recorded.

The data stored in the low-quality data storage unit 707 is posted on the video-sharing website by the wireless communication unit 708 (Step S808).

Figure 9:
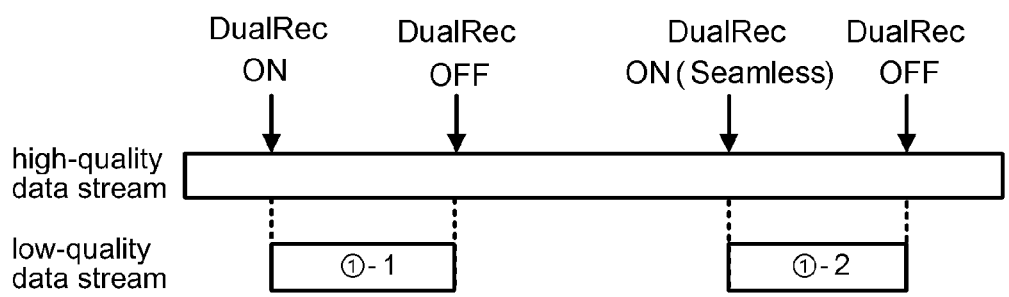
FIG. 9 is a conceptual view illustrating storage and deletion of a high-quality data and a low-quality data according to the exemplary embodiment 2 when a seamless linkage is provided between data.

FIG. 9 is a conceptual view of storage of the high-quality data and the low-quality data when the seamless linkage is provided between the data.

As illustrated in FIG. 9, the high-quality data alone is outputted and recorded until it is requested otherwise by the user. As soon as the request from the user is received, the low-quality data is outputted and stored. The outputted low-quality data is linked to the data recorded in the past and then stored in the low-quality data storage unit 707. When the user suspends the low-quality recording process or the duration of the low-quality recording process exceeds a given period of time, the output of the low-quality data is suspended.

When the seamless information generating unit 706 is thus provided in the device which records the same inputted image with the high and low qualities both at a time, the recorded data can be linked to the past recorded data.

The video camera with a communication function according to the present exemplary embodiment has an external appearance similar to that of the exemplary embodiment illustrated in FIG. 6.

As described so far, the video camera with a communication function according to the present exemplary embodiment can record the same image with the high and low image qualities both at a time, thus recording the low-quality data that can be directly posted on the video-sharing website without editing. In the event that the low-quality recorded data is short of a desirable footage, the low-quality data can be linked to the other low-quality recorded data similarly recorded in the past, so that the linked data can be recorded as a file.

Exemplary Embodiment 3

An exemplary embodiment 3 of the present invention describes processing steps for recording an inputted moving image data with a low image quality while recording the same moving image data with a high image quality at a time, provided that the low-quality recording only starts when an inputted audio meets a given requirement.

Figure 10:
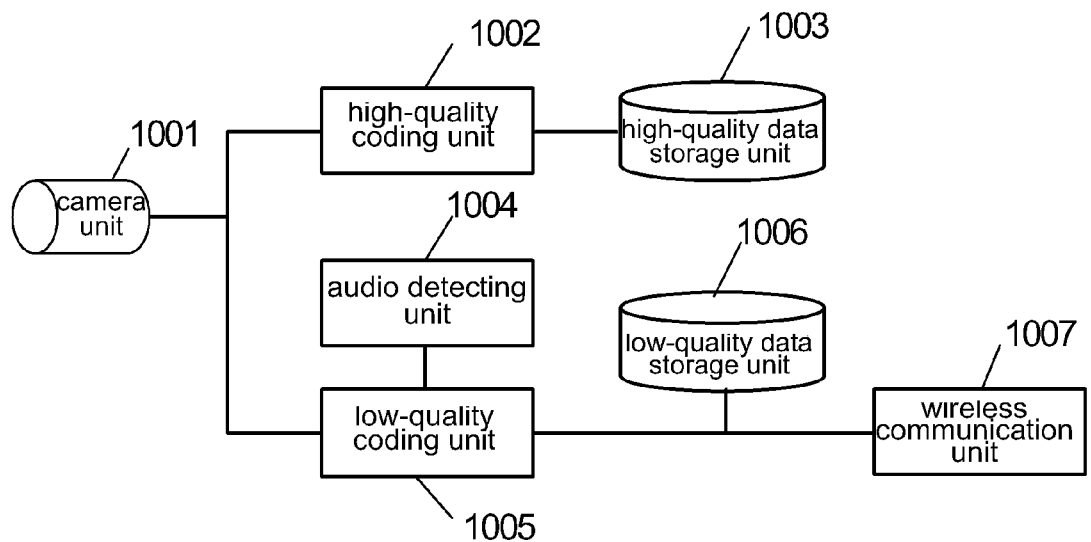
FIG. 10 is a block diagram illustrating a video camera with a communication function according to an exemplary embodiment 3 of the present invention.

FIG. 10 is a block diagram illustrating a video camera with a communication function according to the present exemplary embodiment.

The video camera with a communication function comprises a camera unit 1001 to which an image obtained by a camera is inputted, a high-quality coding unit 1002 for coding data of the inputted image with a high image quality, a high-quality data storage unit 1003 for storing therein the high-quality coded data, an audio detecting unit 1004 for starting or suspending a low-quality recording process when an inputted audio meets a given requirement during the high-quality recording process, a low-quality coding unit 1005 for coding the inputted image data with a low image quality, a low-quality data storage unit 1006 for storing therein the low-quality coded data, and a wireless communication unit 1007 for transferring the low-quality data to a different apparatus.

A processing flow of the video camera with a communication function is described below.

The camera unit 1001 inputs therein an image thereby captured which a user wants to record. The high-quality coding unit 1002 compresses the image captured by the camera unit 1001 with the high image quality. Specifically describing the high image quality, for example, codec is "MPEG4 AVC/H264", an angle of view is 1,920×1,080, and a frame rate is 60 fps.

The high-quality data storage unit 1003 stores therein the moving image data outputted from the high-quality coding unit 1102.

When a user starts to record the moving image data with the low image quality during the high-quality recording process to post the recorded data on a website, the audio detecting unit 1004 activates the low-quality coding unit 1005 in the case where the inputted audio meets the given requirement to start the low-quality recording process. To suspend the low-quality recording process, the audio detecting unit 1004 requests the low-quality coding unit 1005 to suspend the low-quality recording process when the inputted audio no longer meets the given requirement or the duration of the low-quality recording process exceeds a given period of time.

The given requirement of the inputted audio is, for example, detection of a sound or a word registered in advance.

The audio detecting unit 1004 may start or suspend the low-quality recording process in the event that a sound volume exceeds a given threshold value.

The low-quality coding unit 1005 is instructed by the audio detecting unit 1004 to code the image captured by the camera unit 1001 with the low image quality, and compresses the image as instructed. The low-quality data storage unit 1006 stores therein the low-quality moving image data outputted from the low-quality coding unit 1005.

Specifically describing the low image quality, for example, codec is "MPEG4", an angle of view is 320×240, and a frame rate is 30 fps.

In the case where the device is preset to start the data recording at a time point earlier by a given period of time, generally called a pre-recording feature, the data storage by the low-quality data storage unit 1006 may start with the moving image data outputted earlier by a given period of time than a time point when the audio detecting unit 1004 starts the data recording.

When the device is on standby after the pre-recording feature is set, all of images within a given timeframe are always stored and updated in an internal memory. More specifically, all of video images taken at a given time point onwards are recorded and erased repeatedly so that the latest video images at the given time point onwards are always stored. When the low-quality recording process starts, the video images in a built-in memory are transferred to the low-quality data storage unit 1006 and linked to the low-quality data thereafter recorded. More specifically describing the given time point onwards, the video images to be stored can be traced back, for example, 10 seconds.

The wireless communication unit 1007 transfers the moving image data stored in the low-quality data storage unit 1006 to a different apparatus. An example of the wireless communication is wireless LAN.

The wireless communication unit 1007 can post the moving image data recorded with the low image quality on, for example, a video-sharing website.

When the moving image data is posted on the video-sharing website, the Internet address of the video-sharing website is registered in advance and accessed by the wireless communication unit 1007, and any necessary low-quality data is chosen from the low-quality data storage unit 1006 and posted on the website. The audio data is inputted through a microphone (not illustrated in the drawings) and detected by the audio detecting unit 1004.

Figure 11:
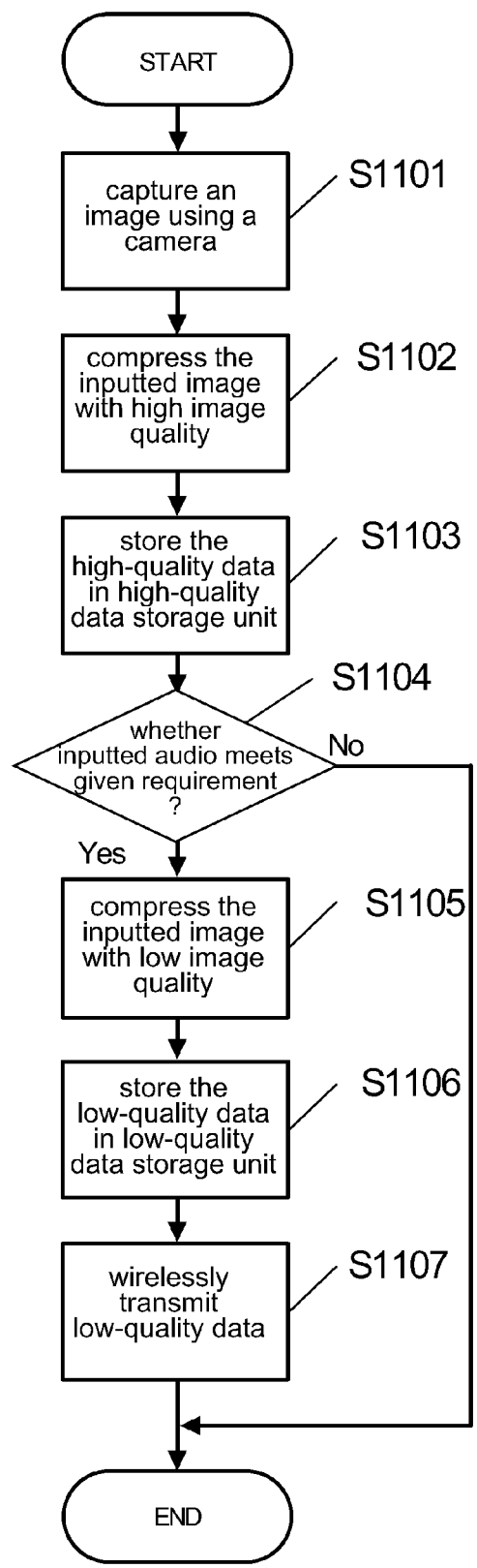
FIG. 11 is a flow chart illustrating an operation of the video camera with a communication function according to the exemplary embodiment 3.

Referring to a flow chart illustrated in FIG. 11, an operation of the video camera with a communication function is described.

First, a user positionally adjusts the camera unit 1001 to face an intended object to capture its images (Step S1101).

The high-quality coding unit 1002 compresses the images captured by the camera unit 1001 with the high image quality (Step S1102).

The moving image data compressed with the high image quality is stored in the high-quality data storage unit 1003 (Step S1103).

Whether the audio data meets the given requirement is confirmed (Step S1104). Having confirmed that the audio data meets the given requirement, the images compressed with the high image quality are compressed by the low-quality coding unit 1005 so as to comply with a file format suitable for posting the data on the video-sharing website, and image quality codec, bit rate, and frame rate which are lower than in the high-quality recording process (Step S1105).

Then, the moving image data compressed with the low image quality is stored in the low-quality data storage unit 1006 (Step S1106). Having confirmed in Step 1104 that the audio data does not meet the given requirement, the low-quality data is not recorded.

The data stored in the low-quality data storage unit 1006 is posted on the video-sharing website by the wireless communication unit 1007 (Step S1107).

Figure 12:
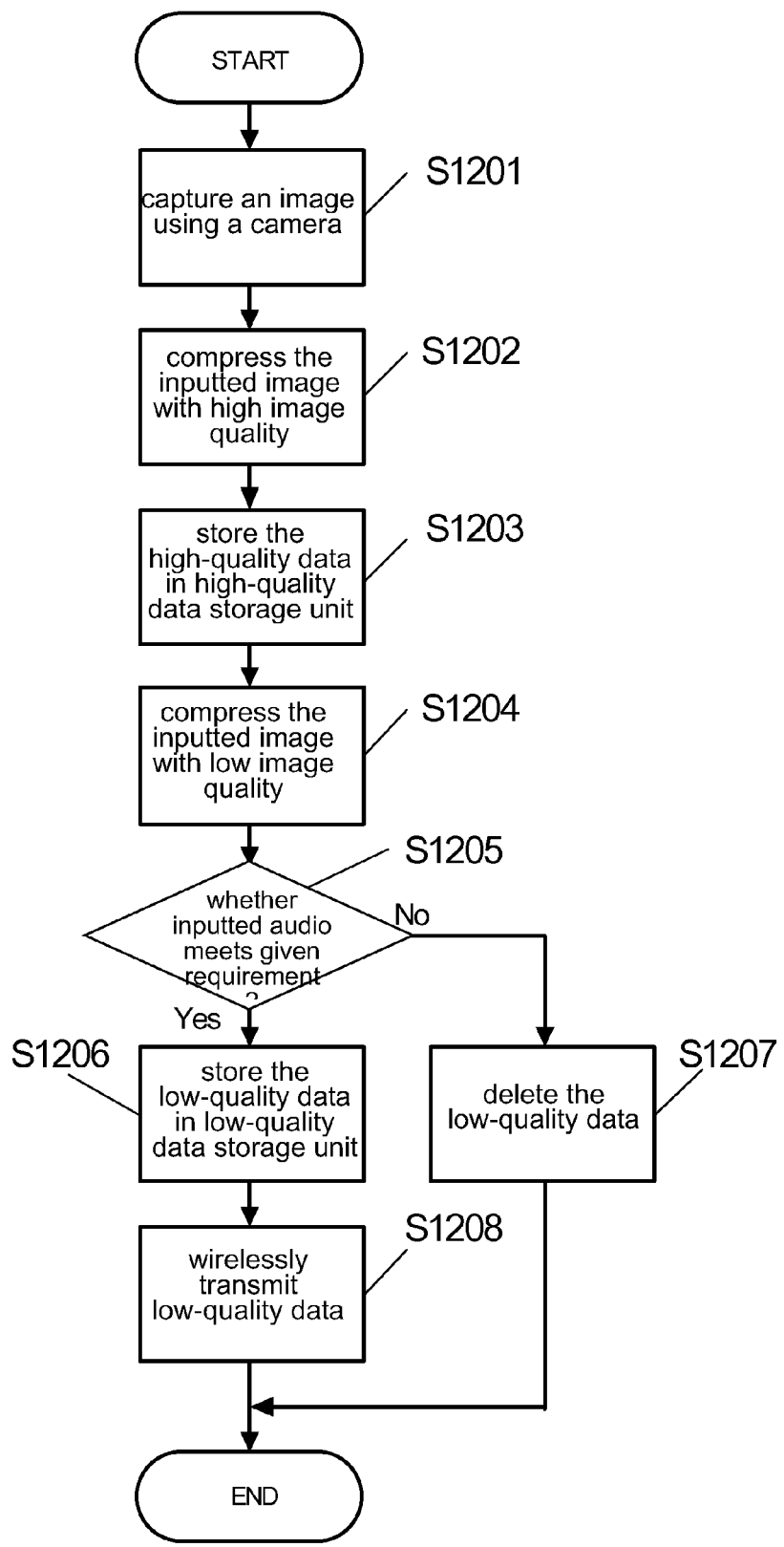
FIG. 12 is a flow chart illustrating an operation of the video camera with a communication function according to the exemplary embodiment 3 when the pre-recording feature is set.

Referring to a flow chart illustrated in FIG. 12, an operation of the video camera with a communication function at the time of setting the pre-recording feature is described.

First, a user positionally adjusts the camera unit 1001 to face an intended object to capture its images (Step S1201).

The high-quality coding unit 1002 compresses the images captured by the camera unit 1001 with the high image quality (Step 1202).

The moving image data compressed with the high image quality is stored in the high-quality data storage unit 1003 (Step S1203).

The images compressed with the high image quality are compressed by the low-quality coding unit 1005 so as to comply with a file format suitable for posting the data on the video-sharing website, and image quality codec, bit rate, and frame rate which are lower than in the high-quality recording process (Step S1204).

Whether the audio data meets the given requirement is confirmed (Step S1205). Having confirmed that the audio data meets the given requirement, the low-quality data is stored in the low-quality data storage unit 1006 (Step S1206).

Having confirmed that the audio data does not meet the given requirement, the low-quality data is discarded (Step S1207).

The data stored in the low-quality data storage unit 1006 is posted on the video-sharing website by the wireless communication unit 1007 (Step S1208).

Figure 13:
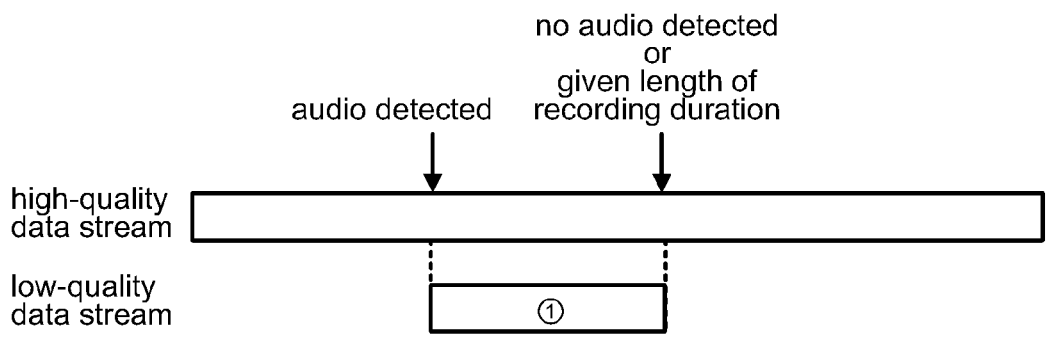
FIG. 13 is a conceptual view illustrating storage and deletion of a high-quality data and a low-quality data according to the exemplary embodiment 3 when an inputted audio is detected.

FIG. 13 is a conceptual view of storage of the high-quality data and the low-quality data in the audio detection.

As illustrated in FIG. 13, the high-quality data alone is outputted and recorded until the audio data meets the given requirement. As soon as the audio data meets the given requirement, the low-quality data is outputted and stored in the low-quality data storage unit 1006. When the audio data no longer meets the given requirement or the duration of the low-quality recording process exceeds a given period of time, the output of the low-quality data is suspended.

Figure 14:
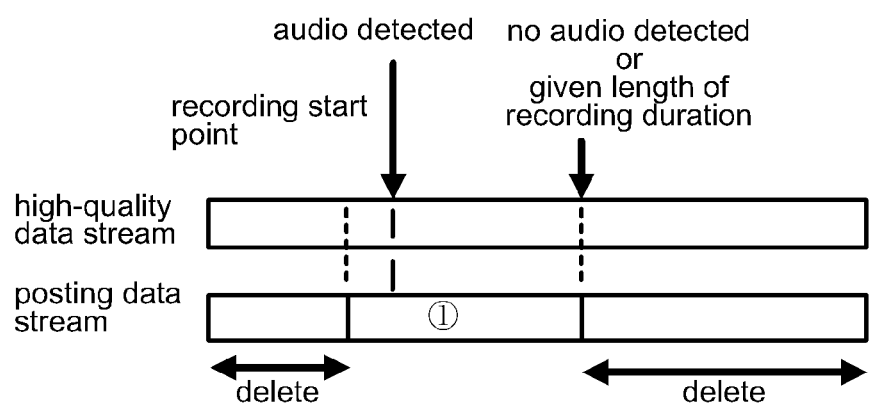
FIG. 14 is a conceptual view illustrating storage and deletion of the high-quality data and the low-quality data according to the exemplary embodiment 3 after the pre-recording feature is set.

FIG. 14 is a conceptual view of storage or deletion of the high-quality data and the low-quality data after the pre-recording feature is set.

As illustrated in FIG. 14, the high-quality data and the low-quality data are both outputted, however, the high-quality data alone is recorded but the low-quality data is deleted during the high-quality recording process. As soon as the audio data meets the given requirement, the low-quality data is stored in the low-quality data storage unit 106, which starts with the low-quality data at a time point earlier by a given period of time than a time point of the audio detection. When the inputted audio data meeting the given requirement is no longer detected or the duration of the low-quality recording process exceeds a given period of time, the deletion of the low-quality data restarts.

FIG. 15 is a conceptual view of storage of the high-quality data and the low-quality data in the audio detection.

As illustrated in FIG. 15, the high-quality data alone is outputted and recorded until the sound volume exceeds the threshold value. As soon as the sound volume exceeds the threshold value, the low-quality data is outputted and stored in the low-quality data storage unit 1006. When the sound volume is below the threshold value or the duration of the low-quality recording process exceeds a given period of time, the output of the low-quality data is suspended.

Thus, the device configured to record the same inputted image with the high and low image qualities both at a time is provided with the audio detecting unit 1004 capable of controlling the timing of start or suspension of the low-quality recording process, wherein only the data requested by the user can be recorded with the low image quality.

FIG. 16 shows an external appearance of the video camera with a communication function.

As illustrated in FIG. 16, the video camera with a communication function comprises an input unit 1602 for switching to a mode configured to start or suspend the low-quality recording process while continuing the high-quality coding process when the audio data meets the given requirement, and an input unit 1601 for starting a wireless communication.

As described so far, the video camera with a communication function according to the present exemplary embodiment can record the same image with the high and low image qualities both at a time, thus recording the low-quality data that can be directly posted on the video-sharing website without editing. Further, the low-quality recording process can automatically start when the inputted audio data is detected without any handling step by the user.

Exemplary Embodiment 4

An exemplary embodiment 4 of the present invention describes processing steps for recording an inputted moving image data with a low image quality while recording the same moving image data with a high image quality, provided that the low-quality recording only starts when an inputted image information registered in advance is detected.

FIG. 17 is a block diagram illustrating a video camera with a communication function according to the present exemplary embodiment.

The video camera with a communication function comprises a camera unit 1701 to which an image obtained by a camera is inputted, a high-quality coding unit 1702 for coding data of the inputted image with a high image quality, a high-quality data storage unit 1703 for storing therein the high-quality coded data, an image detecting unit 1704 for starting or suspending the low-quality recording process when an image information registered in advance is detected during the high-quality recording process, a low-quality coding unit 1705 for coding the inputted image data with a low image quality, a low-quality data storage unit 1706 for storing therein the low-quality coded data and a wireless communication unit 1707 for transferring the low-quality data to a different apparatus.

A processing flow of the video camera with a communication function is described below.

The camera unit 1701 inputs therein an image thereby captured which a user wants to record. The high-quality coding unit 1702 compresses the image captured by the camera unit 1701 with the high image quality. Specifically describing the high image quality, for example, codec is "MPEG4 AVC/ H264", an angle of view is 1,920×1,080, and a frame rate is 60 fps.

The high-quality data storage unit 1703 stores therein the moving image data outputted from the high-quality coding unit 1702.

When a user starts to record the moving image data with the low image quality during the high-quality recording process to post the recorded data on a website, the audio detecting unit 1704 activates the low-quality coding unit 1705 in the case where the image information registered in advance is detected to start the low-quality recording process. To suspend the low-quality recording process, the image detecting unit 1704 requests the low-quality coding unit 1705 to suspend the low-quality recording process when the image information registered in advance is no longer detected or the duration of the low-quality recording process exceeds a given period of time.

Examples of the image information registered in advance are landscape, construction, animal, plant, article, and person.

The audio detecting unit 1704 may start or suspend the low-quality recording process in the event that a facial information registered in advance is detected.

The low-quality coding unit 1705 is instructed by the image detecting unit 1704 to code the image captured by the camera unit 1701 with the low image quality, compresses the image as instructed. The low-quality data storage unit 1706 stores therein the low-quality moving image data outputted from the low-quality coding unit 1705.

Specifically describing the low image quality, for example, codec is "MPEG4", an angle of view is 320×240, and a frame rate is 30 fps.

In the case where the device is preset to start the data recording at a time point earlier by a given period of time, generally called a pre-recording feature, the data storage by the low-quality data storage unit 1706 may start with the moving image data outputted earlier by a given period of time than a time point when the image detecting unit 1704 starts the data recording.

When the device is on standby after the pre-recording feature is set, all of images within a given timeframe are always stored and updated in an internal memory. More specifically, all of video images taken at a given time point onwards are recorded and erased repeatedly so that the latest video images at the given time point onwards are always stored. When the low-quality recording process starts, the video images in a built-in memory are transferred to the low-quality data storage unit 1706 and linked to the low-quality data thereafter recorded. More specifically describing the given time point onwards, the video images to be stored can be traced back, for example, 10 seconds.

The wireless communication unit 1707 transfers the moving image data recorded in the low-quality data storage unit 1706 to a different apparatus. An example of the wireless communication is wireless LAN.

The wireless communication unit 1707 can post the moving image data recorded with the low image quality on, for example, a video-sharing website.

When the moving image data is posted on the video-sharing website the Internet address of the video-sharing website is registered in advance and accessed by the wireless communication unit 1707, and any necessary low-quality data is chosen from the low-quality data storage unit 1706 and posted on the website.

A microphone (not illustrated in the drawings) is used to input the audio data.

Figure 18:
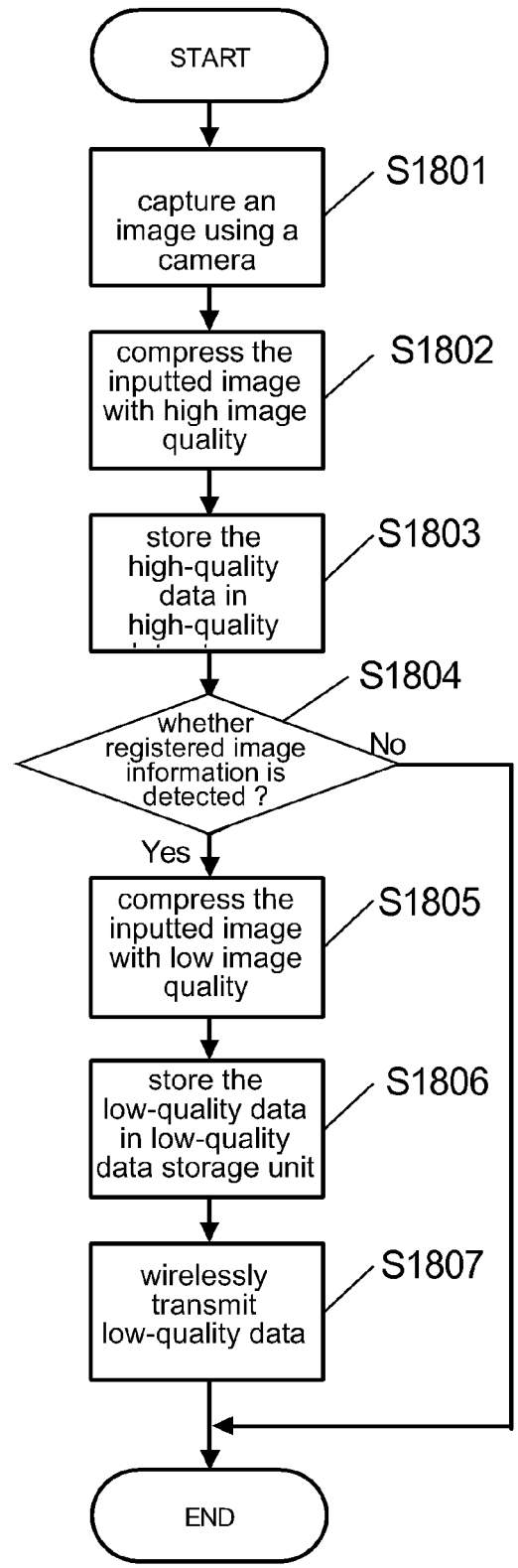
FIG. 18 is a flow chart illustrating an operation of the video camera with a communication function according to the exemplary embodiment 4.

Referring to a flow chart illustrated in FIG. 18, an operation of the video camera with a communication function is described.

First, a user positionally adjusts the camera unit 1701 to face an intended object to capture its images (Step S1801).

The high-quality coding unit 1702 compresses the images captured by the camera unit 1701 with the high image quality (Step S1802).

The moving image data compressed with the high image quality is stored in the high-quality data storage unit 1703 (Step S1803).

Whether the image information registered in advance is detected is confirmed (Step S1804). Having confirmed that the image information is detected, the images compressed with the high image quality are compressed by the low-quality coding unit 1705 so as to comply with a file format suitable for posting the data on the video-sharing website, and image quality codec, bit rate, and frame rate which are lower than in the high-quality recording process (Step S1805).

Then, the moving image data compressed with the low image quality is stored in the low-quality data storage unit 1706 (Step S1806). Having confirmed in Step 1804 that the image information is not detected, the low-quality data is not recorded.

The data stored in the low-quality data storage unit 1706 is posted on the video-sharing website by the wireless communication unit 1707 (Step S1807).

Figure 19:
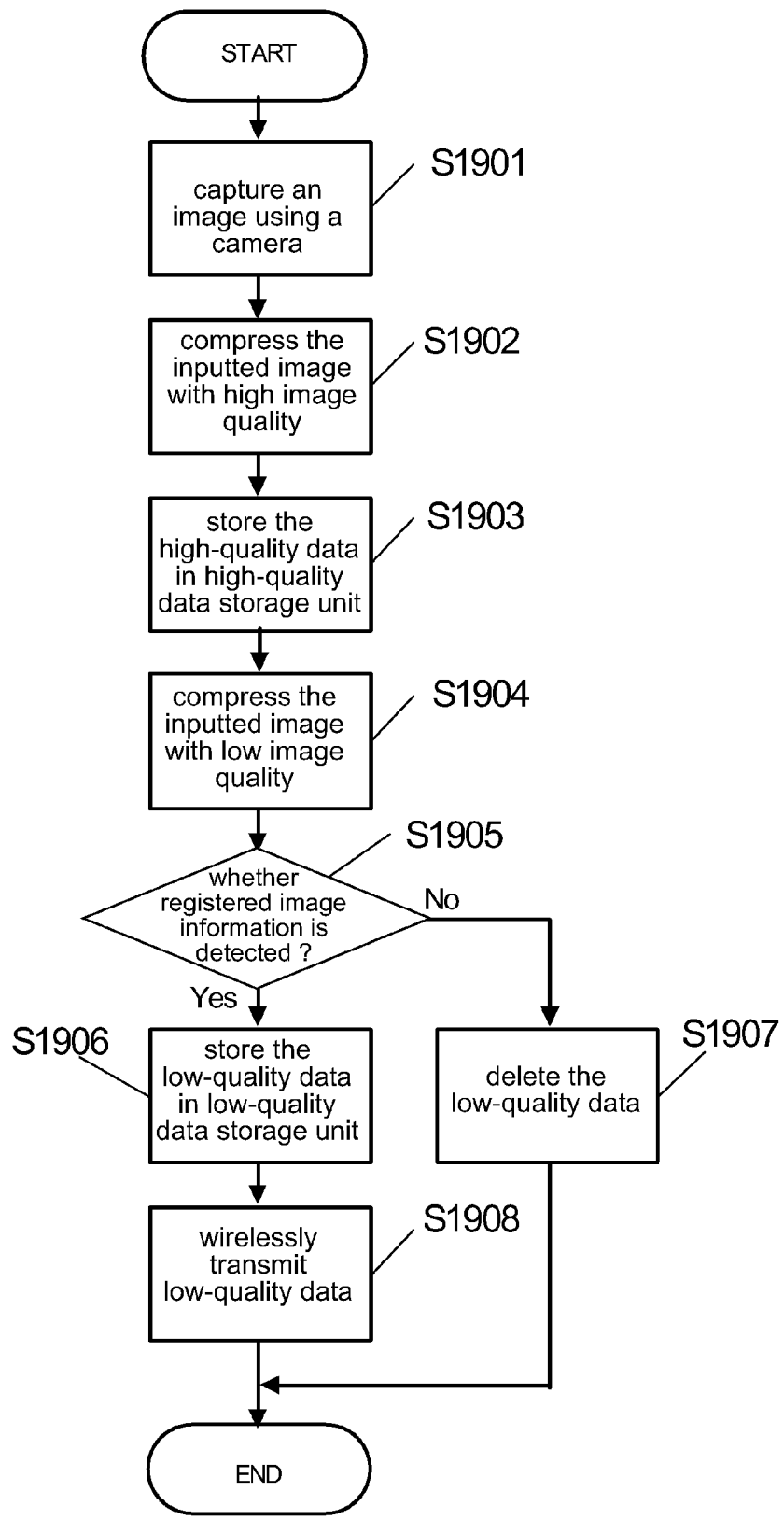
FIG. 19 is a flow chart illustrating an operation of the video camera with a communication function according to the exemplary embodiment 4 when the pre-recording feature is set.

Referring to a flow chart illustrated in FIG. 19, an operation of the video camera with a communication function at the time of the setting the pre-recording feature is described.

First, a user positionally adjusts the camera unit 1701 to face an intended object to capture its images (Step S1901).

The high-quality coding unit 1702 compresses the images captured by the camera unit 1701 with the high image quality (Step S1902).

The moving image data compressed with the high image quality is stored in the high-quality data storage unit 1703 (Step S1903).

The images compressed with the high image quality are compressed by the low-quality coding unit 1705 so as to comply with a file format suitable for posting the data on the video-sharing website, and image quality codec, bit rate, and frame rate which are lower than in the high-quality recording process (Step S1904)

Whether the image information registered in advance is detected is confirmed (Step S1905). Having confirmed that the image information is detected, the low-quality data is stored in the low-quality data storage unit 1706 (Step S1906).

Having confirmed that the image information is not detected, the low-quality data is discarded (Step S1907).

The data stored in the low-quality data storage unit 1706 is posted on the video-sharing website through the wireless communication (Step S1908)

FIG. 20 a conceptual view of storage of the high-quality data and the low-quality data in the image detection.

As illustrated in FIG. 20, the high-quality data alone is outputted and recorded until the image information registered in advance is detected. As soon as the image information registered in advance is detected, the low-quality data is outputted and stored in the low-quality data storage unit 1706. When the image information registered in advance is no longer detected or the duration of the low-quality recording process exceeds a given period of time, the output of the low-quality data is suspended.

FIG. 21 a conceptual view of storage or deletion of the high-quality data and the low-quality data after the pre-recording feature is set.

As illustrated in FIG. 21, the high-quality data and the low-quality data are both outputted. However, the high-quality data alone is selectively recorded but the low-quality data is deleted during the high-quality recording process. As soon as the image information registered in advance is detected, the low-quality data is outputted and stored in the low-quality data storage unit 1706, which starts with the low-quality data at a time point earlier by a given period of time than a time point of the image detection. When the image information registered in advance is no longer detected or the duration of the low-quality recording process exceeds a given period of time, the deletion of the low-quality data restarts.

Figure 22:
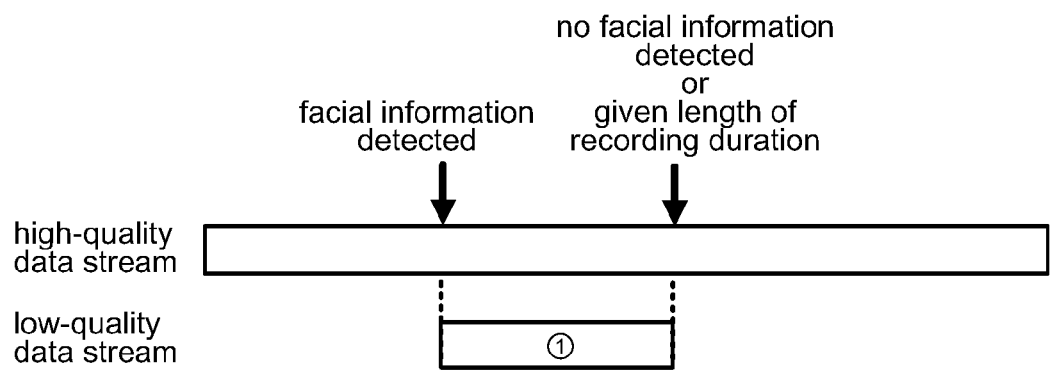
FIG. 22 is a conceptual view illustrating storage and deletion of the high-quality data and the low-quality data according to the exemplary embodiment 4 when a face image is detected.

FIG. 22 a conceptual view of storage of the high-quality data and the low-quality data in the facial information detection.

As illustrated in FIG. 22, the high-quality data alone is outputted and recorded until the preregistered facial information is detected. As soon as the preregistered facial information is detected, the low-quality data is outputted and stored in the low-quality data storage unit 1706. When the preregistered facial information is no longer detected or the duration of the low-quality recording process exceeds a given period of time, the output of low-quality data is suspended.

According to the device which records the same inputted image with the high and low image qualities at a time provided with the image detecting unit 1704 configured to control the timing of starting or suspending the low-quality recording operation, any desirable scene wanted by the user can be automatically recorded with the low image quality.

Figure 23:
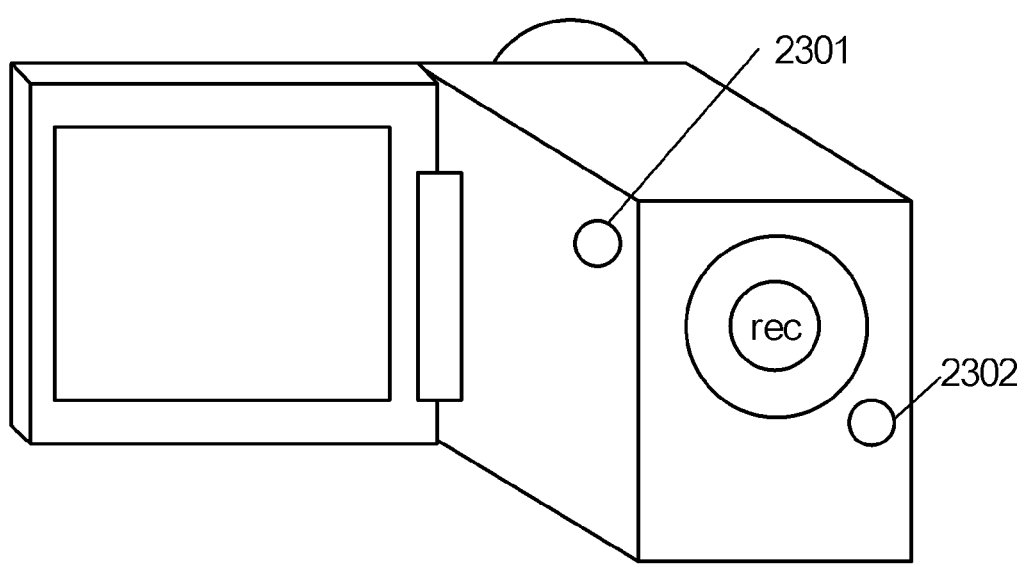
FIG. 23 shows an external appearance of the video camera with a communication function according to the exemplary embodiment 4.

FIG. 23 shows an external appearance of the video camera with a communication function.

As illustrated in FIG. 23, the video camera with a communication function comprises an input unit 2302 for switching to a mode configured to start or suspend the low-quality recording process while continuing the high-quality coding process when the preregistered image information is detected, and an input unit 2301 for starting a wireless communication.

As described so far, the video camera with a communication function according to the present exemplary embodiment can record the same image with the high and low image qualities both at a time, thus recording the low-quality data that can be directly posted on the video-sharing website without editing. Further, the low-quality recording process can automatically start when the image is detected without any handling step by the user.

According to the exemplary embodiments, the two different coding units are provided so that the wanted data alone can be selectively recorded with the low image quality during the high-quality recording process. Therefore, it can be avoided to record any unwanted data with the low image quality, and the low-quality data thus obtained can be directly transmitted to a different apparatus in the absence of PC.

Thus, the video data can be recorded with the high image quality to be recorded on a recording medium and also recorded with the low image quality to be posted on the Internet website, and the low-quality recording operation can be arbitrarily commenced or suspended. Therefore, a particular editing process is unnecessary to post the video images on the video-sharing website, and the video images can be easily posted on the video-sharing website by way of the communication function of the digital video camera.

The low-quality recording process can automatically start in response to the detection of sound or voice, the s volume of sound or voice, image, or face registered in advance, or can trace back the images to be recorded a given period of time using the pre-recording feature. Thus configured, the data can be recorded without missing any important scene.

The video camera with a communication function was so far described based on the exemplary embodiments 1-4, however, the video camera with a communication function is not necessarily limited thereto. Hereinafter, modified embodiments of the present invention are described.

1) In the exemplary embodiments, the video camera with a communication function according to the present invention was described. The operation of the video camera may be configured by either hardware or software, or software and hardware may be combined to carry out the processing steps.

2) The exemplary embodiments are not necessarily limited to the two different coding formats of high and low image qualities.

3) The communication means described in the exemplary embodiments is the wireless LAN, however, cable communication is another option.

4) The data communication through the communication function described in the exemplary embodiments was intended to access the video-sharing website. However, the data communication may be directed to other destinations, for example, PC, server, TV, DVD recorder, and blue-ray recorder.

5) The exemplary embodiments describe some examples of the sound, voice, or volume of sound or voice registered in advance to be detected by the audio detecting unit, however, the target of detection is not necessarily limited to these examples.

6) The exemplary embodiments describe some examples of the image and face registered in advance to be detected by the image detecting unit, however, the target of detection is not necessarily limited to these examples.

7) The data recorded with the low image quality in the exemplary embodiments may not be posted in real time.

8) The processing steps (functions) described in the exemplary embodiments may be handled by a single apparatus (system) in a centralized manner, or by a plurality of apparatuses in a decentralized manner.

Industrial Applicability

The present invention provides an advantageous device that can be used as, for example, a digital video camera or a mobile telephone.

Description of Reference Symbols

101, 701, 1001, 1701 camera unit
102, 702, 1002, 1702 high-quality coding unit
103, 703, 1003, 1703 high-quality data storage unit
104, 704 low-quality coding controller
105, 705, 1005, 1705 low-quality coding unit
106, 707, 1006, 1706 low-quality data storage unit
107, 708, 1007, 1707 wireless communication unit
706 seamless information generating unit
1004 audio detecting unit
1704 image detecting unit
601, 1601, 2301 input unit for starting wireless communication
602 input unit for starting or suspending a low-quality recording process
1602, 2302 input unit for switching to a mode configured to start or suspend a low-quality recording process

What is claimed is:

1. An audio video recording device for recording audio and video data, comprising:
   a camera unit to which a captured moving image is inputted;
   a high-quality coding unit for compressing the moving image captured by the camera unit with a high image quality;
   a high-quality data storage unit for recording therein data of the compressed moving image outputted from the high-quality coding unit;
   a low-quality coding controller for starting and suspending a low-quality recording process during the high-quality recording process;
   a low-quality coding unit for compressing the moving image captured by the camera unit with a low image quality in accordance with an instruction by the low-quality coding controller;
   a low-quality data storage unit for recording therein data of the compressed moving image outputted from the low-quality coding unit; and
   a communication unit for transferring the moving image data recorded in the low-quality data storage unit to a different apparatus,
   wherein when the low-quality coding controller starts a low-quality image recording during the high-quality recording process, a moving image data outputted from the high-quality coding unit and a moving image data outputted from the low-quality coding controller are both continuously recorded, and when the low-quality image recording process is suspended during the high-quality recording process, only the moving image data outputted from the high-quality coding unit is recorded.

2. The audio video recording device as claimed in claim 1, wherein
   the low-quality coding unit stores the moving image data in the low-quality data storage unit, starting with the data outputted at a time point earlier by a given period of time than a time point when the low-quality coding controller starts the recording process.

3. An audio video recording device for recording audio and video data, comprising:
   a camera unit to which a captured moving image is inputted;
   a high-quality coding unit for compressing the moving image captured by the camera unit with a high image quality;
   a high-quality data storage unit for recording therein data of the compressed moving image outputted from the high-quality coding unit;
   a low-quality coding controller for starting and suspending a low-quality recording process during the high-quality recording process;
   a low-quality coding unit for compressing the moving image captured by the camera unit with a low image quality in accordance with an instruction by the low-quality coding controller;
   a low-quality data storage unit for recording therein data of the compressed moving image outputted from the low-quality coding unit;
   a seamless information generating unit for generating an information used to seamlessly link the moving image data outputted from the low-quality coding unit to the low-quality data recorded in the past; and
   a communication unit for transferring the moving image data recorded in the low-quality data storage unit to a different apparatus,
   wherein when the low-quality coding controller starts a low-quality image recording during the high-quality recording process, a moving image data outputted from the high-quality coding unit and a moving image data outputted from the low-quality coding controller are both continuously recorded, and when the low-quality image recording process is suspended during the high-quality recording process, only the moving image data outputted from the high-quality coding unit is recorded.

4. An audio video recording device for recording audio and video data, comprising:
   a camera unit to which a captured moving image is inputted;
   a high-quality coding unit for compressing the moving image captured by the camera unit with a high image quality;
   a high-quality data storage unit for recording therein data of the compressed moving image outputted from the high-quality coding unit;
   an audio detecting unit for starting and suspending a low-quality moving image recording process in the case where an inputted audio meets a given requirement during the high-quality recording process;
   a low-quality coding unit for compressing the moving image captured by the camera unit with a low image quality in accordance with an instruction by the audio detecting unit;
   a low-quality data storage unit for recording therein data of the compressed moving image outputted from the low-quality coding unit; and
   a communication unit for transferring the moving image data recorded in the low-quality data storage unit to a different apparatus,
   wherein when the audio detecting unit starts a low-quality image recording during the high-quality recording process, a moving image data outputted from the high-quality coding unit and a moving image data outputted from the low-quality coding controller are both continuously recorded, and when the low-quality image recording process is suspended during the high-quality recording process, only the moving image data outputted from the high-quality coding unit is recorded.

5. The audio video recording device as claimed in claim 4, wherein
   in the case where the audio detecting unit detects that the inputted audio meets the given requirement, the low-quality coding unit stores the moving image data in the low-quality data storage unit, starting with the data outputted at a time point earlier by a given period of time than a time point when the audio detecting unit detects that the inputted audio meets the given requirement.

6. The audio video recording device as claimed in claim 4, wherein
   the audio detecting unit starts or suspends the low-quality moving image recording process when a sound volume exceeds a threshold value.

7. An audio video recording device for recording audio and video data, comprising:
   a camera unit to which a captured moving image is inputted;
   a high-quality coding unit for compressing the moving image captured by the camera unit with a high image quality;
   a high-quality data storage unit for recording therein data of the compressed moving image outputted from the high-quality coding unit;

an image detecting unit for starting and suspending a low-quality recording process in the case where an image information registered in advance is detected in the inputted image during the high-quality recording process;

a low-quality coding unit for compressing the moving image captured by the camera unit with a low image quality in accordance with an instruction by the image detecting unit;

a low-quality data storage unit for recording therein data of the compressed moving image outputted from the low-quality coding unit; and a communication unit for transferring the moving image data recorded in the low-quality data storage unit to a different apparatus, wherein when the image detecting unit starts the low-quality image recording during the high-quality recording process, both a moving image data outputted from the high-quality coding unit and a moving image data outputted from the low-quality coding unit are continuously recorded, and when the low-quality image recording process is stopped during the high-quality recording process, only the moving image data outputted from the high-quality coding unit is recorded.

8. The audio video recording device as claimed in claim 7, wherein in the case where the image detecting unit detects the image information registered in advance, the low-quality coding unit stores the moving image data in the low-quality data storage unit, starting with the data outputted at a time point earlier by a given period of time than a time point when the image detecting unit detects the image information registered in advance.

9. The audio video recording device as claimed in claim 7, wherein the image detecting unit starts or suspends the low-quality recording process in the case where a facial information registered in advance is detected.

10. The audio video recording device as claimed in any of claims 1 through 9, wherein the low-quality coding unit codes the moving image data in a format suitable for a video-sharing website, and the communication unit can post the moving image data recorded with the low image quality on the video-sharing website.

11. An audio video recording device for recording audio and video data, comprising:

an input unit for inputting a start and suspend of a low-quality coding process while continuing a high-quality coding process; and an input unit for inputting a start communication, wherein when the low-quality coding process is started during the high-quality coding process, high-quality coding audio video data and low-quality coding audio video data are both continuously recorded, and when the low-quality coding process is stopped during the high-quality coding process, only the high-quality coding audio video data is recorded.

12. An audio video recording device for recording audio and video data, comprising:

an input unit for switching to a mode configured to start or suspend a low-quality coding process while continuing a high-quality coding process in the case where an inputted audio meets a given requirement; and an input unit for starting a communication, wherein in said mode configured to start the low-quality coding process during the high-quality coding process, both the high-quality coding audio video data and the low-quality coding audio video data are continuously recorded, and in said mode configured to stop the low-quality coding process during the high-quality coding process, only the high-quality coding audio video data is recorded.

13. An audio video recording device for recording audio and video data, comprising:

an input unit for switching to a mode configured to start or suspend a low-quality coding process while continuing a high-quality coding process in the case where an image information registered in advance is detected; and an input unit for starting a communication, wherein in said mode configured to start the low-quality coding process during the high-quality coding process, both the high-quality coding audio video data and the low-quality coding audio video data are continuously recorded, and in said mode configured to stop the low-quality coding process during the high-quality coding process, only the high-quality coding audio video data is recorded.

* * * * *